March 23, 1937.　　E. W. G. PATERSON　　2,074,667

BRAKE SHOE HEAD

Filed March 15, 1935

Inventor:
Earle W. G. Paterson.
by
H. J. S. Dennison
atty.

Patented Mar. 23, 1937

2,074,667

UNITED STATES PATENT OFFICE 2,074,667

BRAKE SHOE HEAD

Earle W. G. Paterson, Lindsay, Ontario, Canada, assignor of one-half to Robert W. Davis and one-half to George W. Cable, Toronto, Ontario, Canada Application March 15, 1935, Serial No. 11,198

4 Claims. (Cl. 188—223)

The principal objects of this invention are to provide a brake shoe head for use on railway rolling stock, which will be capable of being placed upon a brake beam at either end and without particular reference to which end of the head is uppermost, thereby providing a head which is universally adaptable and will eliminate the necessity of maintaining more than one type of head as standard equipment, and will also avoid errors in assembling brake equipment, which are liable to cost considerable in time and money.

The principal feature of the invention consists in the novel construction of the brake head with an overlapping pair of channel shaped recesses extending therethrough capable of receiving the ends of the brake beam channel bar from either side, so that the shoe head will be in a normal position in respect to the wheels of the car, the head being also provided with oppositely arranged angled orifices to receive the end of the brake beam truss bar, irrespective of the manner in which said head may be placed upon the channel bar of the beam.

In the accompanying drawing, Figure 1 is a perspective view of one end of a brake beam showing my improved brake shoe head mounted thereon.

Figure 1:
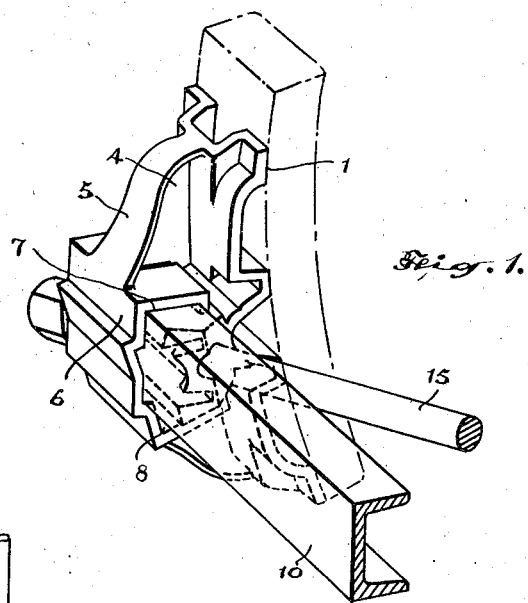
Figure 2:
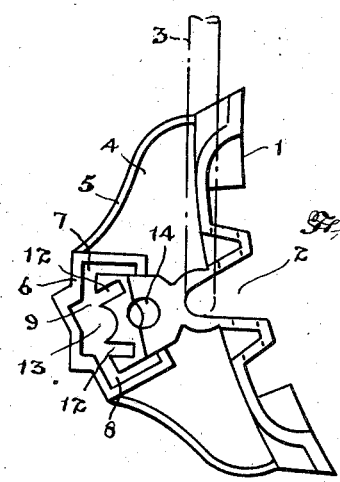
Figure 2 is a side elevational view of my improved brake shoe head.
Figure 3:
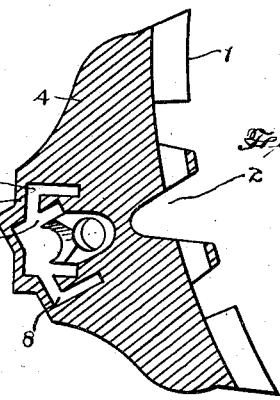
Figure 3 is a vertical mid-sectional view through the brake shoe head.
Figure 4:
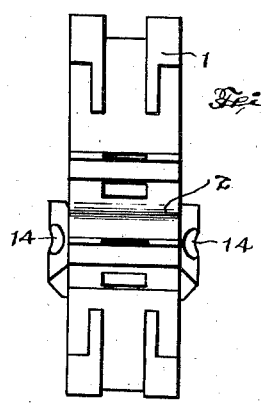
Figure 4 is a front view of the brake shoe head.
Figure 5:
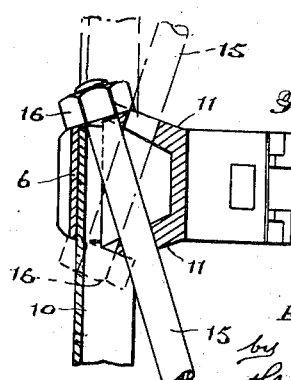
Figure 5 is a horizontal mid-sectional view through the head showing the truss bar end in two positions therein.

In the maintenance of railway rolling stock, it is necessary to frequently change or replace the shoe head on a brake beam, and many different forms of heads have been devised, which purport to be usable as either right or left hand heads, but as far as I am aware it is entirely novel to present a brake shoe head which may be used on either end of a brake beam or placed with either end of the shoe uppermost, so that the shoe will be capable of use in any desired position. Consequently the shoe head will be required to be kept in stock in only one form.

According to this invention the brake shoe head is formed with a face portion 1, which is curved longitudinally to the curvature of the brake shoe, and provided with a centrally arranged V-shaped recess 2 to receive the supporting link 3, upon which the entire brake structure is supported from the car truck. The back of the shoe head is formed with a web structure 4, which is reinforced at its outer sides by a transverse flange 5, which is formed with reversely curved contours at top and bottom, which are integral with a centrally arranged box-like structure 6. This box-like structure is provided with a pair of intersecting channel shaped orifices 7 and 8, which are arranged in angular relation to each other, the back or web portion of the recess 7 intersecting the top flange 9 of the recess 8. The recesses 7 and 8 extend completely through the box structure, and are open at each side of the brake shoe head, so that the head may be inserted upon the channel shaped beam 10 from either side and with either end uppermost.

It will be understood that in having these recesses 7 and 8 extending completely through the brake shoe head, the head may be slipped on to the beam 10 at either end, so that it will hang in the proper position to hold the brake shoe in its proper location below the centre of the car wheel, that is, with the lower end of the shoe pointed forward and downward.

Extending backwardly from the back of the recess 2 for receiving the supporting link 3 is a pair of diverging side flanges 11, which extend centrally into the box like structure 6. These side flanges are each provided with the converging slots 12 which form part of the channel recesses 7 and 8. Between the slots of each flange 11 is arranged a semi-circular notch 13, and aligned in a diagonal direction with each of these slots is a hole 14 in the opposite flange 11, through which the brake beam tie rod or truss 15 extends. The tie rod 15 is disposed in acute angular relationship to the main brake beam 10, and extends through one of the holes 14 and rests in the opposite notch 13, and the fastening nut 16 secured on the outer end of the rod abuts the end of the box structure 6 and the end of the beam and the notched end of the flange, thus holding the brake shoe head snugly up to the end of the beam 10, and the angled truss rod forms a wedge with the beam 10 to secure the head from moving inwardly on the beam 10.

It will be readily understood that a brake shoe head constructed as described and formed in one piece can be very easily and quickly slipped into position on either end of the brake beam without any necessity for selection as to which end of the beam it is, or in which direction the brake shoe should ultimately rest, and by simply tightening the nut on the end of the truss rod, the head is rigidly held in its proper position.

The device is extremely simple, but it is fool proof and can not possibly be wrongly assembled by even the most careless workman, as the diagonally crossing orifice for the truss rod ensures its accurate location.

What I claim as my invention is:—

1. In a brake member, the combination with a brake beam and truss rod, of a brake shoe head having a pair of parallelly arranged recesses extending completely therethrough in intersecting relation, and adapted to receive the end of the brake beam in selective positioning contact from either side in either of two positions, and an angularly disposed recess to receive the truss rod.

2. In a brake member, the combination with a brake beam and truss rod, of a brake shoe head having a box-like structure formed with open ends shaped to receive the brake beam, and integral spaced side flanges formed with notches therethrough to receive the flanges of the brake beam, said side flanges having obliquely arranged holes in addition to the aforesaid flange-receiving notches and notches aligned with said holes, said holes and second-mentioned notches being adapted to coincide with the angularity of the truss rod.

3. In a brake member, the combination with a brake beam and truss rod, of a brake shoe head having a box-like structure extending transversely of the back, said box structure having recesses extending completely therethrough, either one of which is adapted to receive either end of the brake beam from either side of the head, and flanges integral with and extending from the back of the brake shoe head toward the said box-like structure and diverging rearwardly for substantially half their depth and converging rearwardly for the remaining part of their depth, the converging portions having notches in the rearward ends and the diverging portions having holes therethrough, the notches of the convergent portions being aligned with the holes in the divergent portions in acute angular relationship to the respective brake beam recesses, said converging portions of the end flanges presenting outer surfaces flush with the rearward end portion of the said box to form seats for the fastening nut of the truss rod.

4. In a brake member, the combination with a brake beam of channel form and truss rod, of a brake shoe head having integral spaced side flanges, a pair of intersecting channel-shaped orifices extending through said side flanges to receive the end of the brake beam leaving intact portions of said side flanges adapted to embrace the beam flanges, said side flanges also having diagonally disposed sets of openings therethrough adapted to receive the truss rod in angular relation.

EARLE W. G. PATERSON.